United States Patent [19]

Bernstein

[11] 4,092,449
[45] May 30, 1978

[54] ALTERATION-SENSITIVE IMPRINTED ARTICLE

[76] Inventor: Donald J. Bernstein, 2 Grover Ter., Fairlawn, N.J. 07410

[21] Appl. No.: 677,809

[22] Filed: Apr. 16, 1976

Related U.S. Application Data

[63] Continuation of Ser. No. 512,863, Oct. 7, 1974, abandoned, which is a continuation-in-part of Ser. No. 471,226, May 20, 1974, abandoned.

[51] Int. Cl.² .................... B41M 3/14; B44F 1/10; B44F 1/12
[52] U.S. Cl. .................... 428/29; 283/8 B; 283/9 R; 427/7; 428/199; 428/201; 428/207; 428/916
[58] Field of Search .............. 283/8 R, 8 B, 9 R; 106/32.5; 427/7, 258; 428/29, 199, 201, 207, 915, 916

[56] References Cited

U.S. PATENT DOCUMENTS

| 1,454,837 | 5/1923 | Smith | 283/9 |
| 3,001,886 | 9/1901 | Shrewsbury et al. | 428/201 |

*Primary Examiner*—J.C. Cannon
*Attorney, Agent, or Firm*—Lackenbach, Lilling & Siegel

[57] ABSTRACT

An alteration-sensitive imprinted article made of a durable, flexible plastic sheet material has two opposing surfaces, at least one of which is capable of retaining an ink coating. A positive design is directly applied to at least a designated area of said one surface of the sheet, and at least a translucent, non-erasable film or coating or sheet composed of plastic material is bonded to and applied over at least said designated area of said one surface. The film or sheet has on the side thereof opposed to that bonded to said one surface a negative design which is exactly matched to the positive design so that the two designs comprise a blanket or continuous covering over the designated area. An erasable ink coating applied over the translucent, non-erasable film or coating or sheet covers at least the designated area of said one surface. Recorded information is applied over the erasable ink coating, and the blanket covering has a generally contrasting appearance to the erasable coating, so that an attempt to erase the recorded information will simultaneously cause an erasure of the erasable coating thereby revealing the covering formed by said negative and positive designs and its contrasting appearance.

3 Claims, 5 Drawing Figures

ALTERATION-SENSITIVE IMPRINTED ARTICLE

This is a continuation of application Ser. No. 512,863, filed Oct. 7, 1974, and now abandoned, which is, in turn, a continuation-in-part of Ser. No. 471,226, filed May 20, 1974, now abandoned.

An alteration-sensitive identification card, or the like is provided, which can be readily prepared in high volume and at low cost, but which is difficult to alter without making an irreversible change in the article. The irreversible change cannot be repaired except by substantially completely reprinting the entire identification article.

In this modern age of credit cards, personal checks and commercial or traveller's checks, identification of an unknown individual seeking credit at a commercial establishment is a major problem which has not been completely solved. Different types of identification cards, which can be carried on the person, for particular purposes, have been provided. However they have problems which render each type less than completely useful. For example, one type of identification card, of a type often used for identification of employees in industrial establishments, or of, for example, United States Armed Forces personnel, comprises a multi-ply laminated card having a printed paper card as the center or core of the sandwich, to which there is often attached a photograph, thumbprint, signature and/or other means of personal identification. Although the basic card can perhaps be altered, for example, by separating the lamination, a major drawback of this type of identification card is its expense and the fact that each card must be custom-made. Therefore, this card is not suitable for such mass distribution uses as telephone credit cards, automobile licenses, health plan identification cards, or credit card uses. An improved type of this identification card is shown, for example, in U.S. Pat. No. 3,413,171.

A second and simpler type of identification card is of the type often used by banks or as telephone credit cards which often have a pantograph background. Such a background is often found not only on State driver's licenses, but, for example, on commercial paper, such as checks. Generally, in this type of card, a paper has the erasable pantograph or other overall pattern formed thereon, and the identifying information is then typewritten thereover and the signature handwritten thereupon. Similar types of "safety paper" have also been used for various paper documents, negotiable instruments, checks, drafts, bank orders, etc. as well as for paper materials such as tax labels, as shown, for example, in U.S. Pat. Nos. 1,454,837; 1,652,042; 2,223,106; 3,008,841; 3,400,003. In this type of material, as commonly used, for example, on personal checks, a camouflaging imprint is generally formed over the surface of the check, which, when an attempt is made to erase any information imprinted or hand-written thereon, is itself erased to expose a voiding imprint, for example, the word "VOID".

An attempt has been made to form a more durable article out of plastic, particularly in the case of negotiable bank notes which are intended to be reused. However, such products have been complex, difficult to manufacture, and cumbersome to use. See, for example, U.S. Pat. No. 2,330,718.

In accordance with the present invention, there is provided for the first time a flexible plastic article forming a durable identification means which is capable of being manufactured on a mass basis and at relatively low cost, but which is extremely sensitive to alteration so as to render obvious any alteration to invalidate the article for identification or other desired purposes. The alterable surface of this article provides a pleasing appearance which can be used as the background for the manufacture of substantially any type of article, suitable, for example, for identification. Such an article is to be highly durable, as is generally the case with plastic sheet material, is generally resistant to tearing and can, in the preferred aspect, be perforated and folded without destroying the integrity of the product.

In its basic aspect, the invention provides an article which is in the form of a sheet or card which may, if desired, be wound, prepared in the shape of a flexible sheet capable of being folded, creased or rolled, or, for example, as a multipart sheet having perforations to permit ready separation of different portions of the total article. The article of this invention provides means for providing information for identification, or like purposes, which is sensitive to alteration, the article comprising a sheet of flexible plastic material having two opposing surfaces, at least one of such surfaces being capable of retaining an ink coating. A continuous, erasable coating of ink, substantially completely obscuring and covering preferably the entire first surface of the sheet, is formed thereon, the coating having a substantially different, or contrasting, appearance than the first surface of the sheet. Recorded information is imprinted over the erasable coating by mechanical printing means or by writing by hand. Any attempt to erase or change a portion of the recorded information will result in the exposure of the sheet surface, rendering obvious that an alteration was attempted, unless the entire sheet is recoated and reprinted.

In one embodiment the continuous eraseable coating is formed by combining two exactly matched, reversed imprints, i.e. a positive imprint and a negative imprint, which together form an apparently unbroken, continuous surface. In this embodiment, only one of the positive imprint or negative imprint is substantially easily erasable, and the other is a relatively permanent imprint, as explained below. It is often preferred, however, to print a continuous over-all erasable, opaque layer over the matched, reversed imprints. Such a continuous, over-all opaque layer permits greater latitude in determining the color of the top surface onto which the identification information is to be printed, e.g. a desirably white or near-white surface can be obtained.

Preferably, the information is imprinted over the ink coating in such a manner as to form a depression in the coating, whereby merely removing or rendering invisible the ink imprint is not sufficient to remove the impression, thereby requiring the use of abrasion which necessarily results in the breaking of the inked surface. As a further feature of the present invention, a tinted value or screen design, can be applied over the ink coating either before or after the imprinting of the desired information, the tint value being formed such that it is readily erasable.

The accompanying drawings depict examples of preferred embodiments of the present invention.

Figure 1:
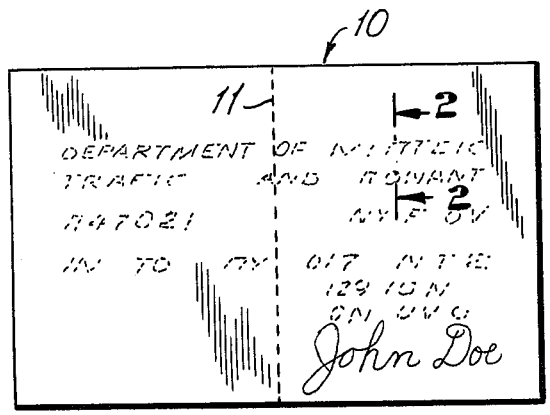
FIG. 1 is a top view of the simplest identification card, in accordance with the present invention.

The alteration-sensitive, flexible plastic identification card, in accordance with the present invention, and as exemplified in the articles shown in the accompanying drawings, takes advantage of the positive properties of plastic sheet, well-known to those in the art, specifically the structural strength of the plastic with regard specifically to flexure, tensile strength and resistance to tearing specifically. The present invention also takes advantage of what up until now the printing art had considered to be a disadvantage, or negative quality, of the plastic, specifically the difficulty, or resistance, to obtaining adhesion between an ink imprinted on its surface and the surface of the plastic. Thus, in accordance with this procedure, a surface is provided for a flexible plastic card, which, while being dry and sufficiently adherent to be handled without removal of any information imprinted thereon, lacks the adhesion required to withstand the abrasion caused, for example, by physical erasure of any of the information imprinted over the surface of the card.

Referring to the accompanying drawings, a two-part identification card, for example, one suitable for use for health insurance or for motor vehicle registration or a driver's license, is formed of a sheet of flexible plastic, in this case a 7½ mil, opaque white, unplasticized polyvinyl chloride polymer having a matte finish on both faces. The sheet is indicated generally by the numeral 10. The flexible sheet of polyvinyl chloride resin 10 is perforated along line 11 by conventional means.

A highly adherent positive design is applied directly to the top surface of sheet 10, preferably a design which explicitly points up the invalidity of the card upon being altered. For example, the word "VOID" can be printed successively, in any desired pattern, over the entire surface of the sheet 10. This invalidating layer of information forms a printed layer 12 directly above sheet 10 and is in turn covered by over-all erasable, substantially completely opaque coating 14, which substantially completely obscures and covers the entire surface of sheet 10. In one embodiment of this invention, the layer 14 can be a single coat of a highly opaque, e.g. metallic, coating, which can adhere to the surface of the sheet 10 but which can be readily removable as, for example, by light abrasion such as by an ordinary pencil eraser, or the like. Such an opaque metallic coating can be applied as a vapor deposit by means of known high vacuum, low temperature vapor deposition technique, which manner of application provides a thin, opaque, adherent coating. Such a metallic layer, however, is not always desirable for a printed sheet, and, accordingly, in a preferred embodiment, layer 14 comprises several coats of an opaque white ink. Generally, a single thick coating is not desirable when using an opaque white ink, as such a layer remains excessively wet for undue periods of time, and may, indeed, completely fail to dry. Accordingly, generally two coats of the white, or other color, opaque ink are necessary in order to completely obscure and cover the information directly printed onto the surface of sheet 10. The ink, or other materials, forming the opaque layer 14 should be capable of drying completely to the touch and being sufficiently adherent to the surface 10 and to whatever material is imprinted thereon so as to be capable of being handled in accordance with normal usage. However, again, the application of relatively light abrasion, as for example the rubbing of a pencil eraser thereover should break the surface of the layer 14 so as to expose the surface of sheet 10 and whatever matter is imprinted thereon.

Imprinted directly above and onto layer 14 is the information, indicated generally by the numeral 16, which can be applied, for example, by the usual typographic systems, such as a typewriter or a letter-press or, for example, the writing system generally obtained in computer outlet terminals. The information can also be printed onto the top surface of the layer 14 by handwritten means using, for example, a ballpoint pen. Each of these systems of imprinting the information results not only in the application of a layer of ink upon the surface of the opaque layer 14 but also causes a depression, or impression, to be formed in the layer such that removal of the ink by a process for rendering it invisible will not remove the impression caused therein, thus maintaining visible whatever information was originally applied. Alternatively, however, nondepression-forming methods can be used, including, for example, electrostatic printing processes.

When the opaque layer 14 is formed of a usual commercial ink, even one which is generally considered to be "opaque", it is usually necessary to provide an additional step in the imprinting of the surface of sheet 10 so as to completely obscure whatever information invalidating the card is imprinted directly thereon. This can be accomplished, for example, by reverse printing directly onto the sheet 10, the reverse image of the initial, difficulty removable information. Thus, for example, referring to FIG. 3, the broken away portion, if the designs shown therein were imprinted with blue ink onto a white background of sheet 10, the reverse image would be imprinted with the blue ink covering those areas left white in the initial imprint. The ink utilized in this second reverse imprint, however, is preferably of a less adherent nature, thereby being readily removable with the removal of the opaque layer 14, thereby rendering visible the initial positive, invalidating, imprint.

In accordance with another embodiment referred to above, either in combination with the over-all erasable opaque coating 14, or in lieu thereof, an image negative to the highly adherent positive design is imprinted directly onto the surface 10 of the sheet; the negative image is carefully matched to the positive design so as to give the appearance of a continuous surface, even without the application of the over-all erasable opaque coating 14. The erasable reverse imprint preferably covers a major portion of the surface of the sheet.

The underside surface of sheet 10 can also be imprinted, if desired, and in any case, in commercial operation, it is preferably of substantially the same color appearance as the top surface of layer 14.

Figure 3:
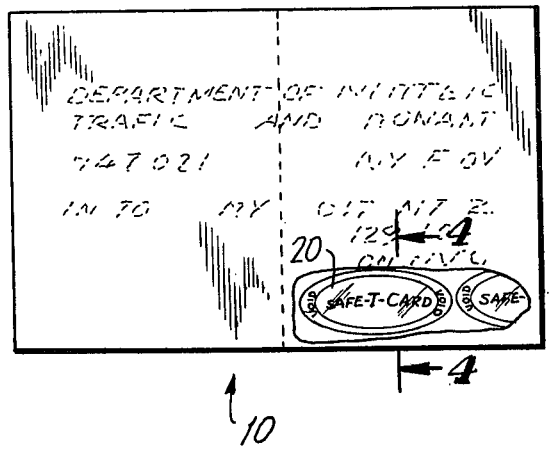
FIG. 3 is a top view of another embodiment of the identification card according to the present invention, partially broken away.
Figure 4:
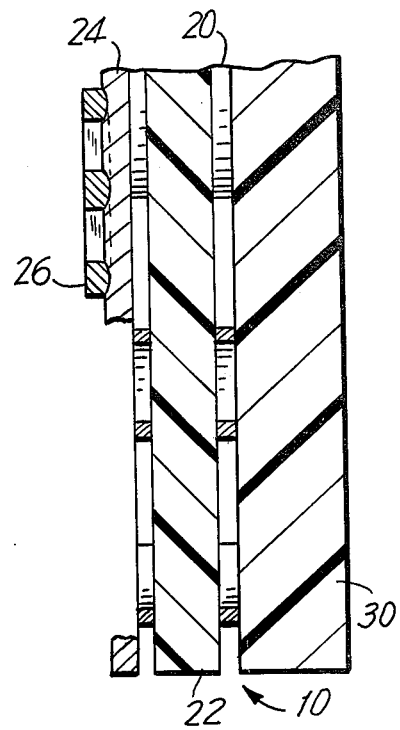
FIG. 4 is a greatly magnified partial view in section along lines 4—4 of FIG. 3.

Referring to FIGS. 3 and 4, a laminated identification card is shown, comprising an opaque 7.5 mil, white, unplasticized vinyl sheet 30, having a matte finish on both sides. An overall pattern 20, shown in part by the partial broken away section in FIG. 3, is imprinted on the front surface of the plastic sheet 10. A sheet of polyester film (0.5 mil) 22 is laminated over the imprint on the top surface of plastic sheet 30. The top surface of the polyester film 22, having the matte finish, is imprinted with a layer comprising two coats of opaque white ink 24. The opaque coating of white ink is dry and adherent to the touch, but can be readily removed by relatively light abrasion, for example, created by rubbing with a pencil eraser. Information imprint 26 is impressed onto the top surface of coating 24 and, as shown, forms an impression in the coating so that removing or rendering invisible the ink from the imprint does not render invisible the impression of the information formed in the coat 24, as explained above.

In an alternative embodiment of the laminated card of FIGS. 3 and 4, the overall pattern 20 can be imprinted as a reverse image on the reverse side of the transparent film 22.

As yet another alternative embodiment, the film 22 can be formed as a coating of a vinyl copolymer in place of the polyester sheet 22.

Figure 2:
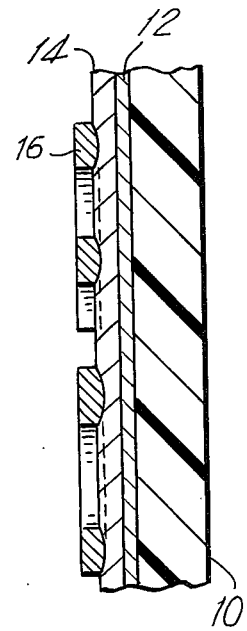
FIG. 2 is a highly magnified sectional view of the card of FIG. 1 along line 2—2.

As in the first embodiment of FIGS. 1 and 2, the reverse side of the opaque plastic sheet 10 can be overall coated to match the surface appearance of the upper coating 24 and/or can be further imprinted as desired.

In carrying out the process in accordance with the present invention to manufacture the alteration-sensitive article of the present invention, a 7.5 mil, white, opaque unplasticized vinyl sheet is cut to the desired size and a matte finish is applied preferably to both surfaces of the sheet. An invalidating imprint is applied to the top surface of sheet 10. Such an imprint, when rendered visible in the finished card, explicitly indicates that the attempted alteration to the card has rendered the card invalid. For example, in FIG. 3, where the portion shown partially broken away exposes the imprint information immediately on the top surface of sheet 10, the word "VOID" is exposed. Such a word is imprinted on the top surface 10. It is desired that this invalidating imprint not be readily removable when, for example, the final finished card is attempted to be altered. In the basic embodiments of FIGS. 1 and 2, this is accomplished by utilizing an ink which will be relatively strongly adherent to the matte surface of sheet 10 and be not readily abraded or removed by the action of an abrasive pencil eraser. Such an ink, for example, can be readily formed utilizing a conventional "Process Blue" ink, i.e. a transparent blue ink, which has been rendered nonreproduceable by conventional Ozalid process. To this conventional ink has been added 20% of a conventional "non-scuff" cobalt drier. Continuing with the embodiment of FIGS. 1 and 2, the hard-drying ink of the invalidating imprint is then permitted to completely dry onto the surface of the sheet 10 before the reverse imprint is formed thereon. The reverse imprint is preferably a relatively easily erasable ink which does not completely adhere to the surface of the sheet. The ink which can be utilized is substantially identical to that of the first, or positive, imprint but contains only a total of 10% by weight of the cobalt drier.

After the second reverse imprint has become dry to touch and can be handled, the first overall coat of an opaque ink to form layer 14 is applied. A conventional opaque ink can be utilized, containing 10% driers. It is again preferred that this overall coat be dry and adherent to the touch, but can be removed by the abrasion caused as with a pencil erasure. Generally, additional coats of the opaque ink are required in order to completely obscure the positive and reverse imprint originally made directly onto the surface of sheet 10. When, for example, a white appearing surface is desired, two coats of such an opaque white ink results in a top surface appearance of the layer 14 of a very pale blue. By the implacing of additional coats of the white, of course, the blue coloration is even further obscured until eventually an almost completely white appearance would result. It has, however, been found that two coats of the white ink are sufficient to form a surface which is suitable for most commercial purposes. The opaque layer 14 can then be imprinted by conventional means, as explained above, to place any desired identifying, or other, information thereon.

The blue-colored ink used, for example, in the formation of the relatively adherent, positive imprint on the top surface of sheet 10 can be formed by a combination, or mixture, of two parts opaque white ink to one part "Process Blue" ink, with 20% by weight of the total mixture of "non-scuff" cobalt drier. The second, or reverse imprint to the surface of sheet 10 is not put down for at least about 5 days, in order to give the positive imprint time to completely dry. The ink used on the reverse imprint is of an identical color and differs only in that only 10% of the total weight of the ink of the cobalt drier is present; this ink is more readily removable and can be, for example, removed by the abrasion from a simple pencil eraser. However the appearance of the combined positive and reverse imprint is of a continuous overall blue coating.

The opaque layer 14 is formed by the successive application of preferably at least two coats of an opaque ink, preferably opaque white, containing about 10% drier.

In all cases, the ink is applied to the plastic sheet by a conventional lithographic process, preferably.

The embodiment shown in FIGS. 3 and 4 differs from that in FIGS. 1 and 2 in that because of the plastic laminate, i.e. the transparent protective film 22 over the basic imprint 20, it is unecessary to form the imprint of a relatively highly adherent difficulty erasable ink, as is the case in the embodiment of FIGS. 1 and 2. Accordingly, the same ink can be used for both the positive and the reverse imprint. However, in this case, after the imprinting of the positive invalidating print on the top surface of the underlying plastic sheet 10, a film 22 is laid thereupon and bonded to the plastic sheet 10. The film 22 can be a preformed sheet of, for example, polyester, as explained above, which can then be solvent bonded to the vinyl sheet substrate 10.

Alternatively, the film can be formed in situ by the application of a fluid coating of, for example, a solution of a polymer or a copolymer of vinyl chloride; this is then permitted to dry and harden in place, forming the desired transparent plastic film. Whichever method is used, the transparent film 22 must have a top surface which is capable of accepting the ink to form the reverse image, if such an image is placed thereupon, so as to form an appearance of a continuous film of color, e.g. blue, over the sheet. Over this reverse imprint is formed the opaque coating 24, as explained above.

In all cases, the ink utilized and plastic film 22 must be compatible to obtain the desired results. The plastic sheet substrate is preferably a form of a non-plasticized vinyl chloride polymer; however, other useful plastics include polyester film, preferably coated to render it opaque, films of polyolefins, especially polyethylene and polypropylene. The use of such synthetic polymer sheet material is well-known to the art and further description is unnecessary.

The preferred opaque plastic sheet is formed of a polymer of vinyl chloride. Such polymers are often utilized in both plasticized and unplasticized grades.

Although the unplasticized grade is preferred, a plasticized sheet can be utilized, if desired. Further, the vinyl chloride polymers are often present actually as a copolymer with other copolymerizable monomers, such as vinyl acetate. Such materials are also known as vinyl chloride polymers, even though they sometimes may contain substantial proportions of the second or even additional monomers.

The preferred preformed transparent plastic film utilized is a polyester film. A preferred example of such polyester film is sold by the duPont Company under the trademark "MYLAR" and is actually a film of a polyethylene glycol ester of terephthalic acid.

Furthermore, the art is well acquainted with the methods necessary to imprint upon such synthetic polymer sheet material and the suitable inks which should be used for each type of material. Accordingly, a further discussion of this subject would only serve to obscure the scope of the present invention. It should be pointed out, however, that the opaque coating 14 and, if present, the reverse imprint of the invalidating material must be imprinted in a manner such that a firm adherence is not formed with the plastic film. Covering the embodiment of FIGS. 1 and 2, the basic positive imprint 14 on the sheet 10 should be formed and imprinted as permanently as possible. As indicated, the difference between a firm adhesion and a removable adhesion, i.e. between the reverse imprint and the positive imprint 12, can be obtained merely by increasing the quantity of the cobalt drying agent; however, applying heat, to bake the ink, can also be used, or using a suitable solvent vehicle, to increase adherence.

Similarly, the plastic coating of film 22 in the alternative embodiments discussed above can be formed by conventional methods as by application, for example, with a doctor blade, to form a film having the desired thickness. In the present case, it was found that inks which are suitable for imprinting on polyester, on the vinyl copolymer coating, and on the vinyl sheet 10, are all the same; different inks need not be utilized for the various layers in the above-referred to embodiments.

The polymeric sheet material used and/or formed in the articles in accordance with the present invention are preferably capable of being perforated so as to render them tearable, but are otherwise resistant to tearing, by having a high tensile strength. They are further preferably capable of being folded without permanently creasing and/or breaking the printed surface.

Figure 5:
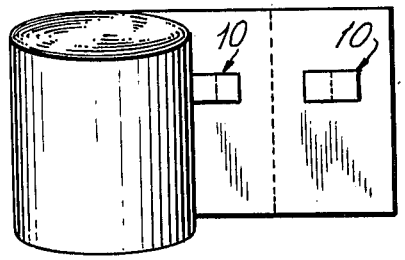
FIG. 5 is a view in perspective showing cards made in accordance with the present invention attached to a roll of computer print-out paper.

Once the basic article, as shown above, has been formed, any desired information or other indicia can be imprinted, preferably by one of the typographic systems, such as a typewriter and/or computer print-out. Of course, if desired, a letter-press or other high-speed printing system, such as flexographic printing, can be utilized as well. However, when the article is intended to be utilized as part of a computer print-out, the article is cut to the desired size and configuration and attached to a computer print-out roll, as by a removable cement. Thus, the information can be automatically printed by the computer onto record cards and simultaneously, or successively, onto the identification cards, for example, a State driver's license. An example of such a computer print-out form is shown in FIG. 5, wherein a rectangular card formed in accordance with the above procedures has been attached to succeeding portions of a computer print-out roll such that as the roll is unwound, successive such cards are placed in position for imprinting.

As a further preferred feature of the present invention, a screen, or "tint value" can be applied to the top of the opaque coating 14 (for any embodiment of the card) using, for example, the same ink or another color ink, as utilized for the formation of the reverse imprint on the sheet 10. Such a screen value is readily smeared by the abrasion of a pencil eraser; and thus, even if the erasing is done very carefully so as to in some way avoid breaking the surface of the opaque coating 24, the tint or screen value will be smeared, thus further rendering visible any attempted alteration of the card, even if the invalidating imprint is not uncovered. The intensity of a tint value can vary from one that is highly visible, for example, a tint value of a "Process Blue" of 24, all the way down to a tint value which is substantially invisible to the untrained eye, e.g. a tint value of the "Process Blue" of 4. In either case, upon rubbing, the tint value smears and then becomes highly visible. Such a screen value or tint value is actually formed of a multitude of individual dots and the strength or intensity of the color is a function of the number of dots per square inch, as well as the size of the dots. It is further possible to apply the screen value, or tint value, simultaneously with the imprinting of at least some of the information or data on the front of the identification card. Where the information, of course, is applied by typographic methods, i.e. as by a typewriter or a computer print-out, the screen value is preferably applied prior to the typing, such that the typing is applied over the screen value.

As yet another alternative, the tint value can only be placed over that portion of the card which presents the greatest danger of alteration. For example, that portion which lists the name and/or the signature of the person to be identified.

As a further alternative to the cards defined above and shown in the accompanying drawings, a transparent sheet of material, formed, for example, of a suitably thick sheet of a polyester or of a transparent vinyl or olefin polymer, is utilized, which, if desired, can be printed on both sides. An overall coating and/or a tint value can be applied to, again, one or both surfaces of the transparent card. A suitable method for printing both surfaces so as to actually read the card only on one surface, is known, for example, under the name "Transface" printing method, as used by the Transface Process Company, Division of Pedeco Printing Corporation.

As yet another embodiment of this invention the flexible sheet product of this invention can be imprinted on its reverse side, utilizing a so-called electrostatic printing process. For example, one such process, known as xerography, utilizes toners applied to paper via a selenium transfer drum. Generally, the particulate image transferred in this xerographic imprinting process is fused at relatively high temperatures to the sheet to which it is applied. Accordingly, a plastic material must be selected which is not physically or chemically degraded at these temperatures. It is especially important that the fusing or softening temperature of the material be sufficiently high, so that it is not deformed or defused during the imprinting process. Any opaque coating on the surface or surfaces of the sheet, and any printing thereover must also be stable at these temperatures. Such preferred high temperature-stable plastic materials are the polyester sheet materials, e.g., MYLAR, as described above. In another particular type of electrostatic process, the reverse side of the sheet must receive a zinc oxide coating before it can receive the electrostatic imprint. Such a zinc oxide coating could also serve to render the sheet opaque were it transparent and/or translucent. The eraseable coating on the surface of a transparent or translucent plastic material also renders the overall article substantially opaque. It is recognized that high temperature-stable sheet can be itself opaque.

In forming such an article, the alteration-sensitive surface can be prepared and any desired information imprinted thereon, in the manner explained above. The reverse side can be imprinted electrostatically at any time, before or after the imprinting of the information on the front side.

The specific embodiments set forth above and in the accompanying drawings are merely intended to be exemplary of the invention described herein and all equivalent processes and materials, known or to be developed by the prior art, can be utilized within the scope of the invention as completely defined by the claims set forth herein below.

What is claimed is:

1. An alteration-sensitive imprinted article comprising a durable sheet of flexible plastic material having two opposing surfaces, at least one such surface being capable of retaining an ink coating; a positive design directly applied to at least a designated area of said one surface of said sheet; at least a translucent, non-erasable film or coating or sheet composed of plastic material bonded to and applied over at least said designated area of said one surface, said film or coating or sheet having on the side thereof opposed to that bonded to said one surface a negative design being exactly matched to said positive design so that negative and positive designs comprise a blanket or continuous covering over said designated area of said one surface; an erasable ink coating over said translucent, non-erasable film or coating or sheet covering over at least said designated area of said one surface; recorded information applied over said said erasable ink coating, and said blanket covering having a generally contrasting appearance to said erasable coating; so that an attempt to erase the recorded information will simultaneously cause an erasure of said erasable coating thereby revealing the covering formed by said negative and positive designs and its contrasting appearance.

2. The article according to claim 1, wherein said erasable coating is opaque.

3. The article according to claim 1, wherein said positive design is highly adherent.

* * * * *